July 10, 1928.
A. H. THOMAS
TIRE SPREADER
Filed July 30, 1927
1,676,970
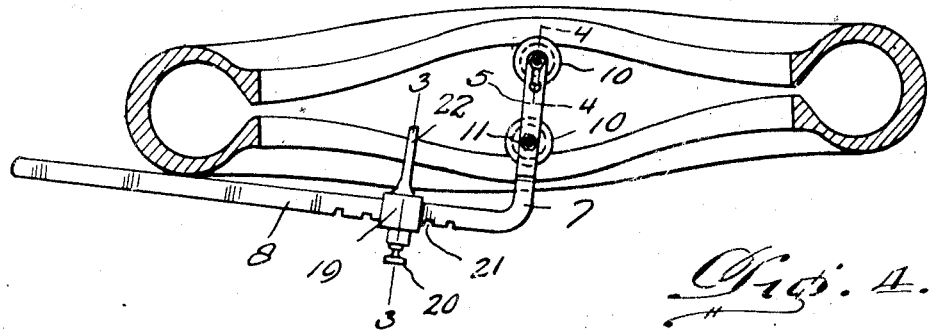
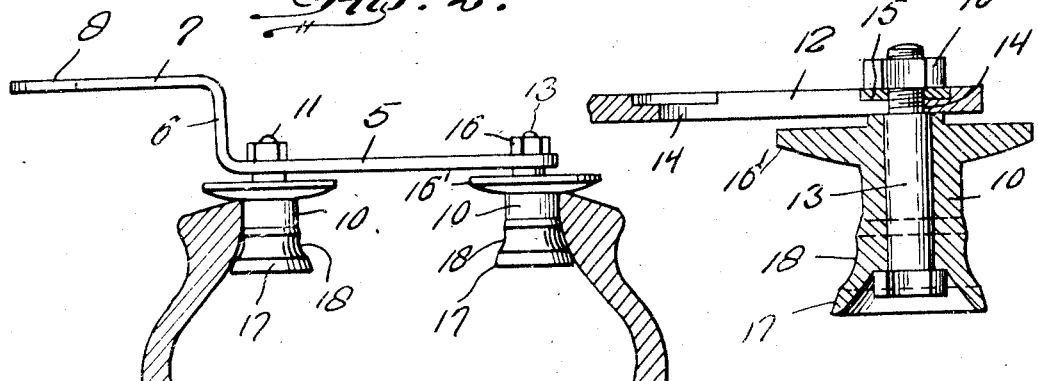
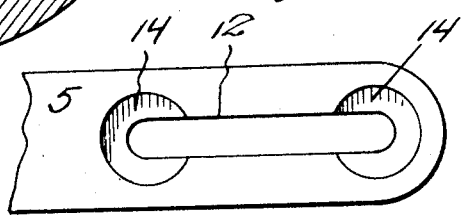
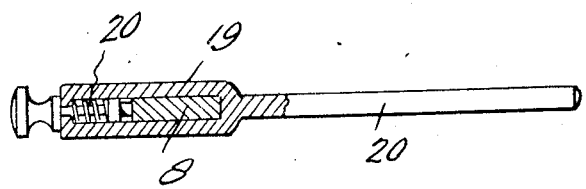
Inventor
Albert H. Thomas,
By Clarence A. O'Brien
Attorney Patented July 10, 1928.

1,676,970

UNITED STATES PATENT OFFICE.

ALBERT H. THOMAS, OF LOUISVILLE, KENTUCKY.

TIRE SPREADER.

Application filed July 30, 1927. Serial No. 209,610.

The present invention relates to a tire spreader, and has for one of its important objects to provide a device whereby the sides of a pneumatic tire casing may be readily spread apart, so that access may be easily had to the interior of the casing.

Another important object of the invention resides in the provision of a device of this nature which may be readily positioned along the beads of a tire therebetween and then operated for spreading the parts of the tire as desired.

Another very important object of the invention is to provide a device of this nature which will not mutilate or abrade the beads of the tire and wherein the device will be provided with adjustable means to accommodate different size tires.

Another very important object of the invention resides in the provision of a device of this nature which when operated to spread the tire casing, will remain in this position without the necessity of using other elements.

A still further very important object of the invention resides in the provision of a tire spreader of this nature which is simple in its construction, inexpensive to manufacture, strong and durable thoroughly efficient and reliable in use and operation, compact and convenient, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a top plan view of the device embodying the features of my invention showing the same applied to a tire casing, said casing being shown in section, Fig. 2 is an end elevation of the device showing the same in the casing, said casing being shown in section, Fig. 3 is a detailed enlarged section taken substantially on the line 3—3 of Fig. 1, Fig. 4 is an enlarged detail section taken substantially on the line 4—4 of Fig. 1, and Fig. 5 is a plan view showing one end of the shank with the roller removed.

Referring to the drawing in detail, it will be seen that the numeral 5 denotes a straight shank having one end merging into a lateral extension 6 which in turn merges into an extension 7 disposed in substantial parallelism with the shank 5 but extending in an opposite direction. This extension 7 merges into an elongated handle 8, extending laterally with respect to the plane containing the shank 5.

The roller 10 is journaled on an axle pin 11 mounted in the end of the shank 5 adjacent the extension 6 and is disposed perpendicularly through the shank. The other end of the shank is provided with an elongated slot 12 for receiving an axle pin or bolt 13, and the ends of the slot 12 merge into counter-sunk openings 14, the counter-sunk portions of which are adapted to receive a washer 15 on the bolt 13, so that a nut 16 may be tightened for holding the bolt 13 in either of the openings 14. Another roller 10 is journaled on this bolt 13.

It will be apparent that the distance between the rollers may thus be adjusted because of the provision of the two openings 14 in the slot 12. Each roller 10 is provided with an annular flange 16' at one end, while the other end is bell-shaped as is indicated at 17 and has an annular groove 18 formed therein.

A sleeve 19 is slidable on the handle 8 and a spring-pressed pin 20 is mounted in the sleeve 17 to engage in notches 21 formed on one edge of the handle 8 so that the sleeve may be held in different adjusted positions. A rod or pin 22 extends from the sleeve 19 in a direction from the handle 8 similar to the direction in which extends the shank 5.

The details of constructions have now been set forth with sufficient clearness to fully comprehend the advantages and operations of this spreader. In an ordinary tire casing, and especially in a new tire casing, the beads of the tire have a tendency to come together. I first place the shank in a position to be in the same plane with largest circumference of the tire, and force the bell ends 17 of the roller 10 in between the beads, the bells 17 and their grooves 18 greatly facilitate this operation.

When the rollers have been inserted, the handle 8 is swung through an arc of a little more than ninety degrees, so that the rollers cross dead center and spread the beads as is clearly illustrated in Fig. 1, thereby affording easy and ready access to the interior of the tire. Of course the roller 10 on the bolt 13 will be adjusted to the outer or inner opening 14, depending upon the size of the tire.

It is desirable that the axes of the rollers be disposed in parallelism with the diameter of the tire and this is accomplished by means of the pin or rod 22 resting on one of the beads as is shown in Fig. 1, and of course this rod or pin will have to be adjusted to accommodate the diameter of the tire by means of the adjustable sleeve 19 as heretofore detailed.

It is desired to point out some other features of advantage and utility. The extension 6 is provided so that the handle 8 may have a greater throw by being closer to the center of the tire. This handle 8 abuts the side of the tire when the rollers 10 are swung past dead center as shown in Fig. 1, and thus the parts are locked in this position against accidental displacement.

The channels 18 in the rollers 10 not only function as heretofore stated, but also tend to resist the accidental withdrawal of the roller when disposed in the tire, and they also are adapted to receive ribs projecting inwardly from some makes of tires.

It is thought that the construction, operation, utility, and advantages of this invention will now be quite apparent to those skilled in this art without a more detailed description thereof.

The present embodiment of the invention has been disclosed in detail merely by way of example, since in actual practice it attains the features of advantage enumerated as desirable in the statement of the invention and the above description.

It will be apparent that changes may be made in the details of construction, and in the combination and arrangement of parts without departing from the spirit or scope of the invention as hereinafter claimed or sacrificing any of its advantages.

Having thus described my invention, what I claim as new is:—

1. A tire spreader of the class described including a shank, a pair of bolts extending from the shank laterally and in spaced parallelism to each other, a handle extending from the shank at an angle thereto, a pin extending laterally from the handle in the same direction with the shank for engaging one bead of the tire.

2. A tire spreader of the class described including a shank, a pair of bolts extending from the shank laterally and in spaced parallelism to each other, a handle extending from the shank at an angle thereto, a pin extending laterally from the handle in the same direction with the shank for engaging one bead of the tire, adjustable means for mounting said pin on said handle.

3. A tire spreader of the class described including a shank, a pair of bolts extending from the shank laterally and in spaced parallelism to each other, a handle extending from the shank at an angle thereto, a pin extending laterally from the handle in the same direction with the shank for engaging one bead of the tire, adjustable means for mounting said pin on said handle, rollers journaled on said bolts.

4. A tire spreader of the class described including a shank, a pair of bolts extending from the shank laterally and in spaced parallelism to each other, a handle extending from the shank at an angle thereto, a pin extending laterally from the handle in the same direction with the shank for engaging one bead of the tire, adjustable means for mounting said pin on said handle, rollers journaled on said bolts, and means whereby one of the bolts may be adjusted with respect to the other bolt to regulate the distance between the two rollers.

In testimony whereof I affix my signature.

ALBERT H. THOMAS.